J. SHOTWELL.
SWIVEL HOSE COUPLING.
APPLICATION FILED APR. 14, 1909.
961,170.
Patented June 14, 1910.
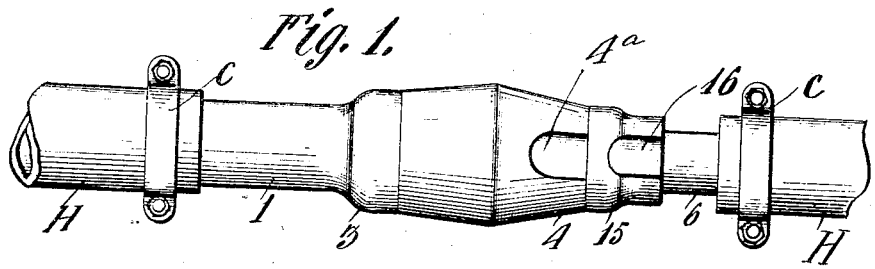
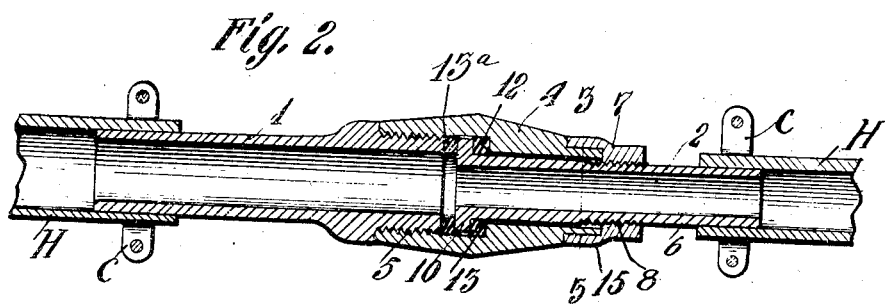
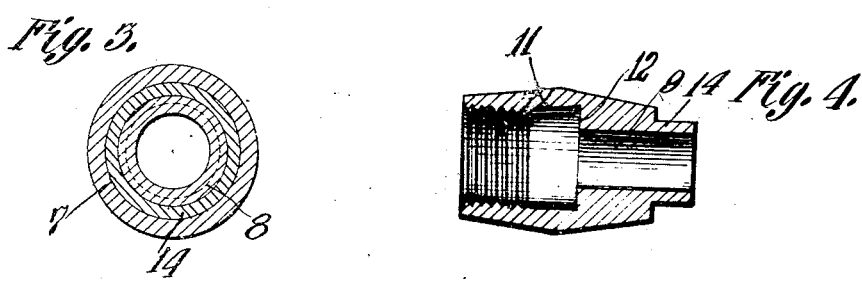
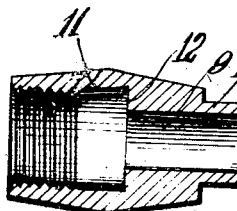
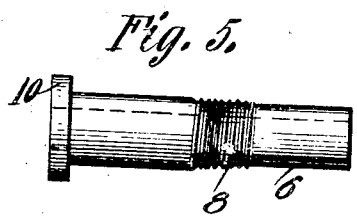
Witnesses
Morris Lessin
E. M. Ricketts
Inventor
James Shotwell
By Watson E. Coleman
Attorney

UNITED STATES PATENT OFFICE.

JAMES SHOTWELL, OF WATSONVILLE, CALIFORNIA.

SWIVEL HOSE-COUPLING.

961,170.  Specification of Letters Patent.  Patented June 14, 1910.

Application filed April 14, 1909. Serial No. 489,938.

*To all whom it may concern:*

Be it known that I, JAMES SHOTWELL, a citizen of the United States, residing at Watsonville, in the county of Santa Cruz and State of California, have invented certain new and useful Improvements in Swivel Hose-Couplings, of which the following is a specification, reference being had to the accompanying drawings.

This invention relates to improvements in detachable couplings for hose, pipes and similar conductors.

The object of the invention is to provide a practical detachable swivel coupling of this character which will provide an effective joint for the sections of water, air and other fluid conductors.

With the above and other objects in view, the invention consists of the novel features of construction and the combination and arrangement of parts hereinafter fully described and claimed, and illustrated in the accompanying drawings, in which—

Figure 1 is a side elevation of my improved coupling; Fig. 2 is a longitudinal section; Fig. 3 is a cross section taken on the line 3—3 in Fig. 2; Fig. 4 is a longitudinal section through the sleeve section of one member of the coupling; and Fig. 5 is a side elevation of the other member of the coupling.

The invention comprises two tubular coupling members 1, 2, the outer ends of which may be suitably shaped to receive hose sections, pipes or the like. As illustrated, said outer ends of the members 1, 2 have hose sections H secured to them by clamps C, but it will be understood that other conductors may be attached to the members of the coupling and secured in any suitable manner. The coupling member 1 consists of a body section 3 and a detachable sleeve section 4, said sections preferably having a screw threaded connection, as shown at 5. The other member 2 also consists of a body section 6 and a sleeve section or nut 7, which latter has a screw threaded engagement with the former, as shown at 8. The body section 6 of the member 2 is adapted to project through the bore or opening 9 in the sleeve section 4 of the member 1 and upon the inner end of said section 6 is a head 10 formed by an annular radially projecting flange, which latter forms an annular shoulder. The flange or head 10 is arranged in an enlarged portion 11 of the bore or opening 9, which enlarged portion 11 forms an annular shoulder 12 for the reception of a packing ring 13 of rubber or the like. Said packing ring is forced against the shoulder 12 and is compressed by the flange or head 10 on the section 2 when the nut section 7 of said member is screwed against the outer end of the sleeve section 4 of the member 2, as will be readily understood upon reference to Fig. 2 of the drawings. The outer end of the sleeve section 4 is preferably reduced to provide a cylindrical bearing hub 14 which projects into and upon which rotates a socketed enlarged portion 15 on one end of the sleeve section or nut 7. If desired, the exterior of the nut 7 may be provided with flat faces 16 for the engagement of a wrench or similar tool, whereby said nut may be rotated for the purpose of compressing the packing ring 13 and providing an effective fluid tight joint. The sleeve section 4 may also be provided with one or more flat faces for engagement by a wrench or similar tool and within said section between the flange 10 of the member 2 and the inner end of the section 3 of the member 1 may be provided a packing ring 13ª as shown in Fig. 2.

In operation when it is desired to separate the members, the nut 7 is screwed inwardly to relieve the pressure on the packing 13, the sleeve section 4 is then unscrewed from the body section 3 of the member 1, and when it is desired to remove the body section 6 of the member 2 from the sleeve section 4 of the other member, the nut 7 is screwed off of the section 6, whereupon the latter may be slipped longitudinally out of the section 4.

From the foregoing it will be seen that the peculiar construction of the several parts produces an exceedingly effective swivel coupling the members of which may readily turn or rotate with respect to each other, but at the same time may be easily disconnected or detached. It will be further noted that the simple construction of the device provides an exceedingly practical coupling which may be produced at a small cost and which will be strong, durable in use, and which will provide an effective fluid tight joint.

Having thus described the invention what is claimed is:

1. A detachable swivel hose coupling comprising a member having a tubular body section and a sleeve section, the body section having an externally screw threaded end, and the sleeve section having a bore with an enlarged portion at one end and a reduced bearing portion at its other end whereby an annular internal shoulder is formed between the two portions of the bore, the large portion of the bore having at its end internal screw threads to receive the threads on the body section whereby the two sections may be detachably connected, the outer end of said sleeve section being formed with a reduced cylindrical bearing portion, a second tubular member arranged within the sleeve section and rotatable in the reduced portion of the bore of the same, the inner end of said second member being formed with an annular radially projecting flange disposed in the large portion of the bore of the sleeve section, the portion of said second member projecting beyond the outer end of the sleeve section being externally screw threaded, annular packing rings arranged in the sleeve member between said flange and said internal shoulder and between said flange and the inner end of the body section of the first mentioned member, and a nut engaged with the external screw threads on the second member and having at its inner end a cylindrical socket to receive and rotate upon the reduced bearing portion of the sleeve section of the first mentioned member.

2. The herein described detachable swivel hose coupling comprising a member having body and sleeve sections, said body section being straight and tubular in shape and adapted to receive a hose section at one of its ends, its other end being externally screw threaded and formed adjacent thereto with an annular enlargement, said sleeve section having a cylindrical bore with an enlarged portion at one end to provide an annular stop shoulder, said enlarged portion of the bore having its outer part internally screw threaded to receive the threaded end of the body section, the exterior of said sleeve section being provided with flat faces, and its other extremity being reduced to provide a cylindrical bearing, a second tubular member having a cylindrical end to rotate in the bore of the sleeve section and formed with an annular radially projecting flange arranged in the enlarged portion of the bore of said sleeve section, said second tubular member having its other end reduced for the reception of a hose section and its intermediate portion externally screw threaded, packing rings arranged in the enlarged portion of the sleeve section on opposite sides of the flange on the second tubular member, and a sleeve nut having a flat faced exterior and internal screw threads to engage the threads on the intermediate portion of the second tubular member, said nut having its inner end enlarged and formed with a cylindrical socket to receive and rotate upon the reduced cylindrical bearing end of said sleeve section.

In testimony whereof I hereunto affix my signature in the presence of two witnesses.

JAMES SHOTWELL.

Witnesses:
 EDWARD W. PALMTAG,
 FRANK B. LAURITZEN.